May 24, 1966  B. K. LUNDE  3,252,334
DROPLET ACCELEROMETER

Filed May 18, 1961  3 Sheets-Sheet 1

INVENTOR.
BARBARA K. LUNDE
BY *Jack Larsen*
ATTORNEY

May 24, 1966  B. K. LUNDE  3,252,334

DROPLET ACCELEROMETER

Filed May 18, 1961  3 Sheets-Sheet 3

SERIES OF COMPENSATED PULSES; YIELDS ZERO AVERAGE FEEDBACK SIGNAL

SERIES OF UNCOMPENSATED PULSES INTERRUPTED BY A COMPENSATED PULSE;
NET NEGATIVE AVERAGE FEEDBACK SIGNAL

*INVENTOR.*
BARBARA K. LUNDE
BY *Jack Larsen*
ATTORNEY

United States Patent Office 3,252,334
Patented May 24, 1966

3,252,334
DROPLET ACCELEROMETER
Barbara K. Lunde, Ames, Iowa, assignor to Massachusetts Institute of Technology, Cambridge, Mass., a corporation of Massachusetts
Filed May 18, 1961, Ser. No. 111,111
9 Claims. (Cl. 73—516)

This application is a continuation-in-part of my copending application Serial No. 102,065, filed April 10, 1961.

This invention relates to accelerometers more particularly to accelerometers of small size and weight suitable for use in space probes and other vehicles adapted for travel in interplanetary space.

Gyroscopes and accelerometers which are small in size, light in weight, and require a minimum of power are desired to fill in between external observations in space vehicle systems. The maintenance of angular orientation by reference to stars is relatively straightforward and practical; however measurements of position by external observation are relatively cumbersome, particularly the derivation of acceleration from such measurements. Accordingly, accelerometers having desirable properties for space vehicles are much to be desired. All of the inertial instruments which are termed "accelerometers" are more rigorously "specific force receivers" in that they respond to both acceleration and gravity. In outer space these instruments mounted on a space vehicle sense only that portion of acceleration due to thrust and other non-gravitational forces.

Figure 1:
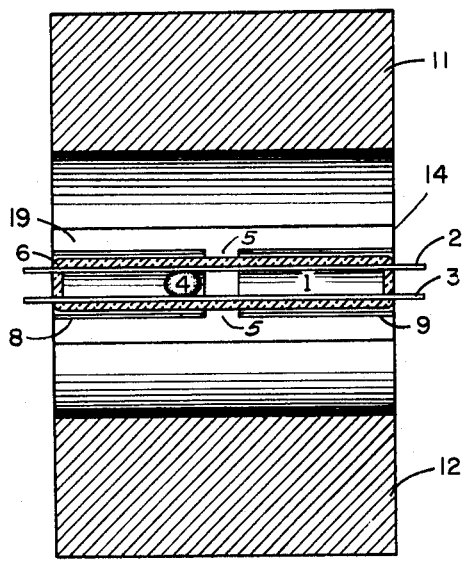
Figure 2:
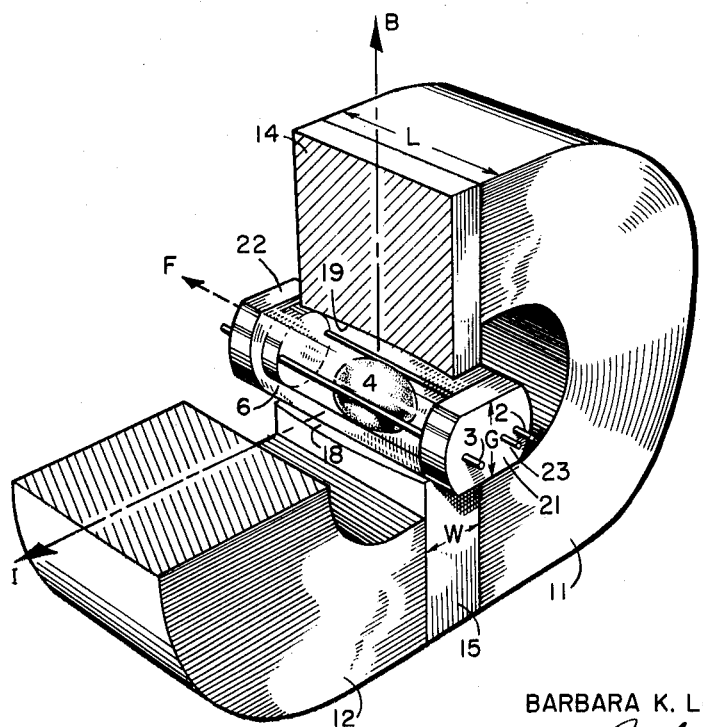
Figure 3:
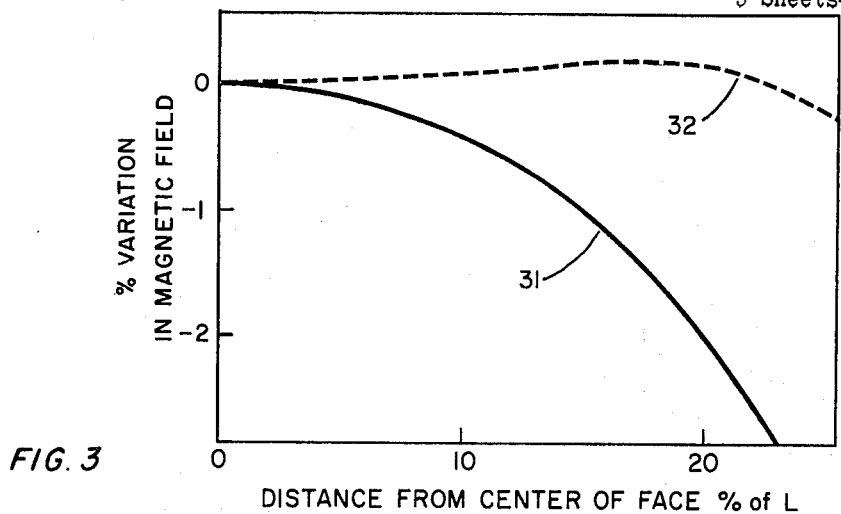
Figure 4:
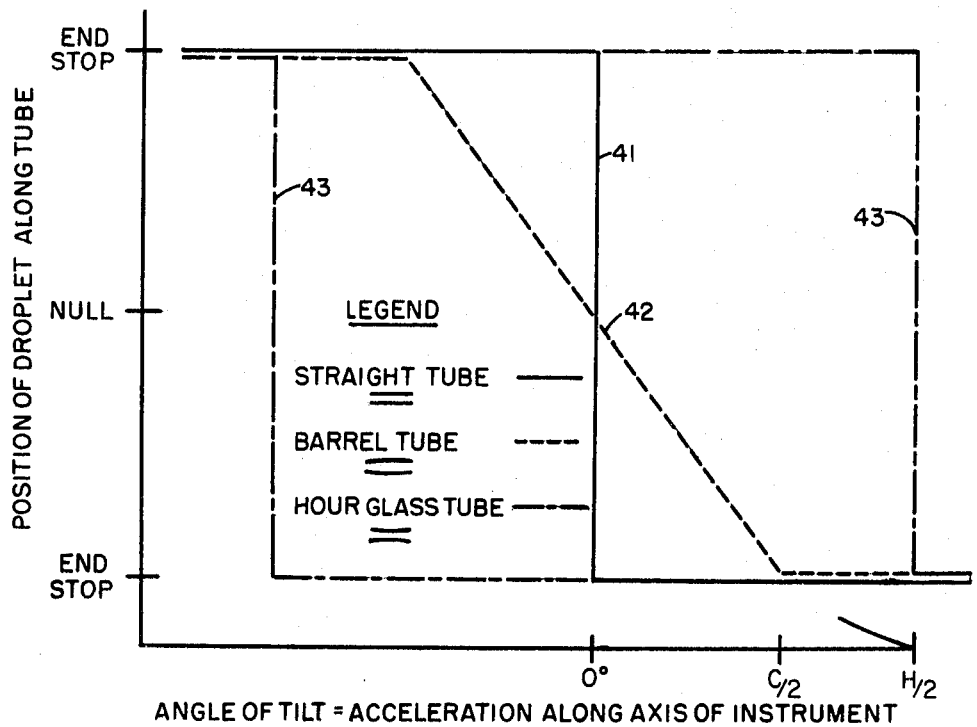
Figure 5:
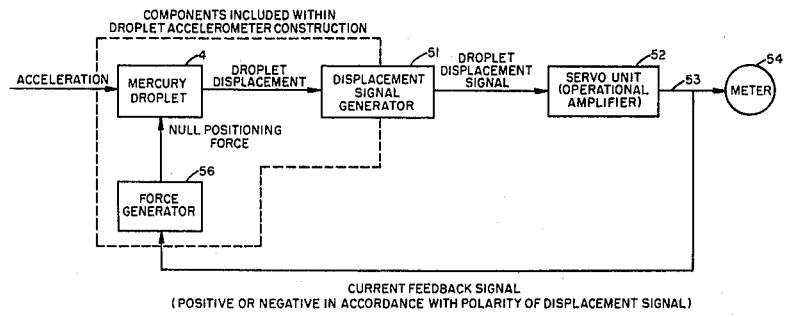
Figure 6:
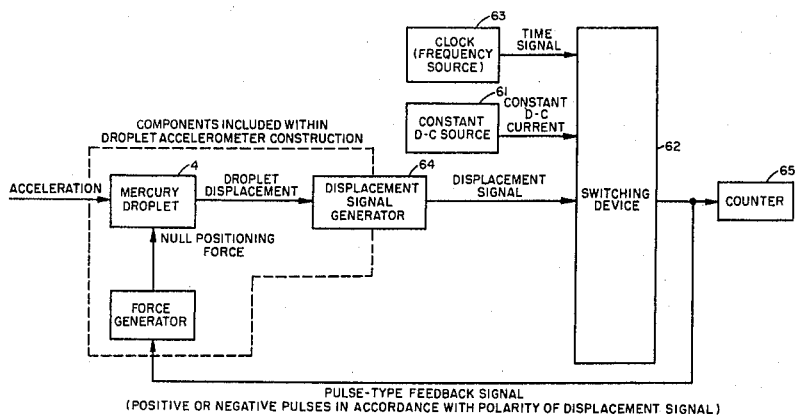
Figure 7A:
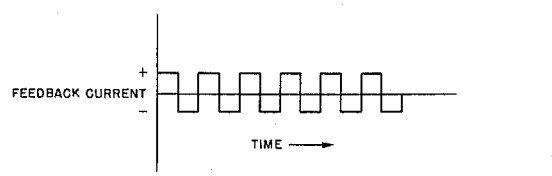
Figure 7B:
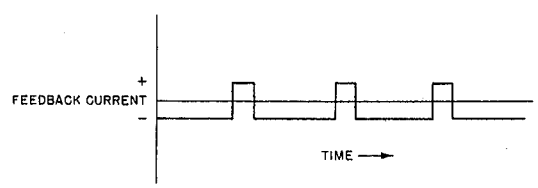

Proposals for space craft frequently incorporate exotic propulsion systems such as electronic ion jets which produce thrusts with very high specific impulse but relatively low absolute value. Accordingly for space travel, accelerometers which are accurate and sensitive to accelerations in the range much below the level of 1 $g$ are necessary. It is an object of this invention to provide a light weight and compact accelerometer of high intrinsic accuracy. It is a further object of this invention to provide a precision accelerometer which is easy to produce and relatively inexpensive. Further objects and advantages of the invention will be apprehended from the appended figures of which:

FIG. 1 is a pictorial representation partially in section of an embodiment of the invention, FIG. 2 is a partially sectioned perspective view illustrating the force balance system of the invention, FIG. 3 is a graph showing effect of pole piece curvature, FIG. 4 is a graph indicating the dependence of the accuracy of the instrument upon the precision of the shape of the accelerometer tube bore, FIG. 5 is a schematic block diagram of an accelerometer system employing continuously variable feedback current, FIG. 6 is a schematic diagram of an accelerometer system employing pulses of current in the forcing circuit, FIG. 7A is a graph of the current in the forcing circuit of FIG. 6 at a condition of zero acceleration component and FIG. 7B is a graphical representation of the current when an acceleration component is present.

As shown in FIG. 1 the accelerometer provides a path 1 for electrical current made up of an input wire 2, an output wire 3 and a liquid metal droplet 4. Wires 2 and 3 are located on diametrically opposite sides of a cylindrical insulating tube 6. The ends of the tube 6 are sealed to enclose the wires, the liquid metal droplet and an inert gas. The tube may be of glass, quartz, or ceramic composition. Metal electrodes 8 and 9 are applied to the outer surface of the tube leaving a central uncoated gap 5 the width of which is small compared to the diameter of the droplet. In operation, the droplet 4 is positioned in this uncoated section. In this position, the capacitance between the droplet 4 and the electrode 8 may be compared to the capacitance between the droplet 4 and the electrode 9. Displacement of the droplet changes the ratio of these capacitances. Permanent magnets 11 and 12, pole piece 14 and another pole piece 15 shown in FIG. 2 are positioned relative to the tube to produce a magnetic field B which is substantially homogeneous and perpendicular to the plane of the loop 1 at the center of the tube 6. Assuming this magnetic field to be directed out of the paper, current flowing into the wire 2, through the droplet 4 and out of the wire 3 produces in the droplet a force tending to drive it to the left, that is, toward the electrode 8.

FIG. 2 represents the interaction between the magnetic field B, the current I and the resulting force F on the droplet 4. Flow through the droplet 4 of an appropriate value of the current I will exert a force F on the droplet which precisely balances the component of specific force along the axis of the tube so that the droplet may remain centered in the tube regardless of the motion of the supporting structure. It is desirable in an instrument of this type that the instrument be sensitive to only one component of acceleration, that is, that the sensitivity to acceleration along the axis of the tube 6 should be the same regardless of acceleration components transverse to the axis of the tube 6. It is also desired that the required balancing current be accurately proportional to acceleration over a wide range of accelerations. Second-order effects resulting in an undesired cross coupling and non-linearity may arise from changes in the shape of the droplet as acceleration forces are applied. The design choice of a liquid metal with high surface tension tends to preserve the sphericity of the drop, and reduce errors of this kind. Calculations show that a specific force of 10 $g$'s will cause a mercury droplet one fifth of a millimeter in diameter to deform or flatten less than $10^{-5}$ centimeter. One $g$ is the specific force of the earth's gravity at sea level. A droplet of mercury slightly larger than the inside diameter of the tube 6 has been found generally satisfactory as the inertial mass for this accelerometer.

The requirement that the droplet be an excellent conductor limits the choice of material to a liquid metal. In addition to mercury, gallium, and sodium-potassium alloy (NaK) may be considered as materials for the droplet. While these alternative materials have the desirable property of relatively low density, mercury is preferred because of its lesser chemical reactivity and because of a greater experience with mercury in the production of millions of thermometers, mercury switches and the like.

While either an electromagnet or a permanent magnet may be used to generate the magnetic field, a permanent magnet is preferred because it requires no power, is less complicated and is probably more stable. An aluminum-cobalt-nickel permanent magnet known in the trade as Alnico VI with temperature control of ±2 degrees centigrade at about 51 degrees centigrade will produce a magnetic field with adequate stability. The magnet illustrated in FIG. 2 comprises permanent magnets 11 and 12 and pole pieces 14 and 15 of "soft" magnetic material. The faces 17 and 18 of the pole pieces are substantially rectangular with a length L and a width W. They are separated by a gap of thickness G. The field in the gap falls off toward the edges.

Satisfactory operation of the device requires that for small displacements of the droplet 4 from its zero point there should be little change in sensitivity. Uniformity of the field is increased as length L and width W of the gap are made large compared to the gap G. However, the mass of magnet material required to produce a given field strength increases in proportion to the pole area. A more powerful means to reduce variations is curvature of the pole faces.

FIG. 3 shows the variation of field strength B along the axis of tube 6 for flat pole faces, curve 31, and, curve 32, for pole faces given a cylindrical curvature to minimize field variation over the central 50% of the gap. The calculated radius of curvature is 6.82 inches for $L=1$ inch, $W=.13$ inch and $G=.27$ inch. In this example, the maximum variation is reduced by a factor of 10 by pole shaping.

The design requirements for a satisfactory tube are few. It must hold the mercury in an inert atmosphere and maintain the position of the wires parallel. Various methods of fabricating a suitable tube are well-known in the art. Successful experimental models have been produced with fused glass assemblies similar to mercury switches. A perfectly shaped tube has an inside diameter that is constant over substantially the entire length of the tube.

The tube 6 may be formed of a refractory ceramic such as one composed primarily of alumina, $Al_2O_3$ in which a precisely dimensioned bore is ground and lapped. End plugs 21 and 22 of alumina are fused with glass to the tube 6 at a temperature well below the softening point of the tube 6. Filling is carried out by a hypodermic needle 23 sealed along with the wires 2 and 3 in the plug 21. After filling it is pinched off and welded shut.

The importance of straight walls in the tube 6 is brought out by FIG. 4. The graph shown in FIG. 4 illustrates the response curve 41 of an accelerometer with a straight tube, and for two inaccurately shaped tubes, curves 42 and 43, for barrel shaped and hourglass shaped inaccuracies respectively. The angles C and H approximate the amount of barrel and hourglass bending respectively. The figure illustrates that, while a certain amount of barrel-type inaccuracy may be tolerable, hourglass inaccuracy leads to difficulties in calibration and adjustment.

Within the tube the wires 2 and 3 of the assembly must be straight, dimensionally stable and of a composition that will not amalgamate with mercury. So called "Van Kuren" tungsten carbide wires meet all of these requirements. They are straight, stiff, accurately dimensioned wires which are commonly used for gaging. Their straightness insures accuracy and minimizes the resistance to droplet movement.

An accelerometer, as just described, may be used with analog closed-loop circuitry as shown in FIG. 5. The acceleration of the mercury droplet 4 produces a displacement of the droplet 4 and a resulting upsetting of the capacitance balance. Appropriate circuitry, as is well-known, detects in a displacement signal generator 51 this change in capacitance balance and produces an error signal which is amplified in a servo unit operational amplifier 52. The output 53 of this amplifier is a measure of the acceleration, measurable by a meter 54. It also is fed back to a current generator 56 which generates a current in the accelerometer loop 1 which is positive or negative depending upon the indicated displacement of the drop and proportional to the indicated acceleration whereby the drop tends to be held in its balance position.

The droplet accelerometer is readily adaptable to digital pulsed forcing techniques in the system indicated in FIG. 6. A current precisely constant in amplitude is passed through the droplet 4 at all times from a current generator 61. A switching device 62 under control of a clock frequency source 63 and the displacement detecting circuitry 64 switches the polarity of the feedback current, thus the heating effect of the current is at all times constant and independent of the measured acceleration. The counter 65 is reversible. It counts the clock signal pulses in one direction for so long as the current feedback is negative and counts in the other direction for so long as the current is positive. The accumulated count on the counter is therefore a measure of the time integral of the acceleration component measured by the accelerometer.

FIG. 7A represents the current flow averaging zero.
FIG. 7B represents current flow under acceleration.

An acceleration of 10 $g$'s is typical of required upper range for an accelerometer of this type. To measure an acceleration of 10 $g$'s, the accelerometer must have a forcing device capable of accelerating the droplet to 10 $g$'s. The acceleration imparted to the droplet depends on the mass of the droplet, the magnitude of the current, the distance the current travels through the droplet, and the magnitude of the magnetic field, that is:

$$a \propto \frac{BId}{m}$$

where $a$ is equal to the acceleration imparted to the droplet by the forcing device, B is the magnetic field on the droplet, I is the current through the droplet perpendicular to the magnetic field, $d$ is the distance the current travels through the droplet, $m$ is the mass of the droplet. In terms of the density $s$ of the liquid $$a \propto \frac{BI}{sd^2}$$

Taking as a reasonable practical stable value for the field 5,000 gauss, 1 ampere as a reasonable value for the current, and the density of mercury, 13.6 gm./cm.$^3$, the relation between acceleration $a$ in $g$ units and the diameter $d$ of the droplet in inches becomes $$a = \frac{0.009}{d^2}$$

The quantity $d$ is substantially a measure of the diameter of the droplet or of the spacing between the wires which are of the same order of magnitude and for this example may be considered equal. For an acceleration of 10 $g$'s the calculated tube diameter is approximately 0.03 inch. For this value of inside diameter, the gap between pole pieces would measure approximately 0.04 inch by 0.04 inch by .12 inch and the weight of an Alnico VI magnet producing the required magnetic field in a gap of these dimensions is 0.04 ounce and its volume is 0.01 cubic inch. These calculations, which must be recognized as approximate and illustrative, are based upon magnetic properties as defined by the permanent magnet handbook published by the Crucible Steel Co. Other arrangements, changes in scale or choices of materials will be recognized as falling within the scope of the invention.

Having thus described the invention what is claimed as new is:

1. A source of magnetic field, a pair of metallic wire electrical conductors having substantially parallel portions within said field and lying in a plane substantially perpendicular to said field, a liquid metal droplet joining said conductors and free to move therealong, a third electrode electrical conductor extending in proximity to said droplet so that the capacitance between said droplet and said third electrode varies as said droplet moves along said parallel conductors.

2. A combination as defined by claim 1 wherein said source of magnetic field comprises a pair of substantially flat pole faces extending generally parallel to said wires and spaced at substantially equal distances at opposite sides of the plane of said wires, said faces being modified by curvature whereby the field in the neighborhood of said droplet is made to approximate a homogeneous field.

3. A combination as defined by claim 1 characterized in that said parallel conductors are fixed on diametrically opposite sides of an insulating tube.

4. A combination as defined by claim 3 wherein said third conductor comprises a conducting coating on a portion of the outside surface of said insulating tube.

5. A combination as defined by claim 3 wherein said tube is a cylindrical ceramic tube.

6. A combination as defined by claim 4 wherein said source of magnetic field comprises a pair of substantially flat pole faces extending generally parallel to said wires and spaced at substantially equal distances at opposite sides of the plane of said wires, said faces being modified by curvature whereby the field in the neighborhood of said droplet is made to approximate a homogeneous field.

7. A combination as defined by claim 5 wherein said liquid metal droplet is of mercury.

8. A source of magnetic field, a pair of electrical conductors having substantially parallel portions within said field and lying in a plane substantially perpendicular to said field, a liquid metallic droplet connecting said conductors and free to move therealong.

9. In combination, a source of magnetic field, a pair of electrical conductors having substantially parallel portions within said field and lying in a plane substantially perpendicular to said field, a liquid metal droplet joining said conductors and free to move therealong, a third conductor and a fourth conductor said third and fourth conductors being so situated in proximity to said droplet that the capacitance between said droplet and said third conductor varies compared to the capacitance between said droplet and fourth conductor as said droplet moves along said parallel conductors.

References Cited by the Examiner

UNITED STATES PATENTS

| 2,591,921 | 4/1952 | Cosgriff et al. | 73—516 |
| 2,979,960 | 4/1961 | Johnson | 73—517 |
| 3,024,662 | 3/1962 | Ryan. | |

FOREIGN PATENTS

| 708,228 | 4/1954 | Great Britain. |
| 715,750 | 9/1954 | Great Britain. |

RICHARD C. QUEISSER, *Primary Examiner.*

S. FEINBERG, SAMUEL BOYD, *Examiners.*